United States Patent Office 2,862,898
Patented Dec. 2, 1958

2,862,898

MODIFIED ALKYD RESINS

Earl C. Chapin, Springfield, Mass., assignor to Monsanto Chemical Company, St. Louis, Mo., a corporation of Delaware No Drawing. Application October 7, 1954
Serial No. 461,017

4 Claims. (Cl. 260—22)

This invention relates to drying oil modified alkyd resins. More particularly the invention relates to drying oil alkyds further modified with certain vinyl monomers and to the process for so modifying them.

The condensation products of polyhydric alcohols with polybasic acids, known commercially as alkyd resins, were developed particularly for use in coating compositions. They have many desirable properties and numerous deficiencies. One of the first and most important modifications thereof was the reaction with drying oils. Such resins came to be known as drying oil alkyds, or oil modified alkyds.

The properties of the drying oil alkyds can be varied to a large extent by varying the amount and type of drying oil reacted therewith. They are more compatible with other natural and synthetic resins customarily used in the surface coating industry. However, even with all such variations, the oil modified alkyd resins leave much to be desired in the way of solvent and weather resistance.

To improve the solvent and weather resistance of the drying oil alkyds, attempts have been made to react them with ethylenically unsaturated polymerizable organic compounds. In addition to the increase in resistance to weather and solvents, these materials aid in shortening the cure time. Unfortunately these systems are difficult to control and generally require the presence of a further modification of the alkyd resin in the nature of a partial reaction with an alpha, beta unsaturated mono or dicarboxylic acid. To some extent the reaction may be controlled by carrying it out in an organic solvent.

One object of this invention is to modify drying oil alkyd resins.

A further object is to modify drying oil alkyds with ethylenically unsaturated organic polymerizable monomers.

Still another object is to improve the drying properties and the solvent and chemical resistance of drying oil alkyd resins.

Still another object is to provide a process for the modification of drying oil alkyd resins with ethylenically unsaturated polymerizable organic compounds.

These and other objects are attained by reacting an alkyd resin which has been previously modified with from 50 to 80% of a drying oil with a mixture of monomeric components at temperatures above 180° C. and at a pressure of 10 to 50 atmospheres.

The following examples are given in illustration and are not intended as limitations on the scope of this invention. Where parts are mentioned they are parts by weight.

Example I

Prepare a drying oil modified alkyd by the following procedure. Mix together 228 parts of soyabean oil, 76 parts of dehydrated castor oil, 80 parts of pentaerythritol and 0.08 part of calcium hydroxide. React the mixture at about 260° C. for about 45 minutes, removing the water of condensation as it is formed. Then add 118 parts of phthalic anhydride and heat the reaction mixture at about 260° C. for about 2 hours. Dilute the product to about 60% solids with xylol. The product is a xylol solution of an alkyd resin modified with a combination of soyabean oil and dehydrated castor oil. It has a viscosity of A–B on the Gardner-Holdt scale and an acid number of 9–11. Films cast from the solution thus prepared cure to hard films at room temperature in air when allowed to stand overnight providing a small amount of cobalt naphthenate is incorporated therein before casting.

Example II

Mix together 1.67 parts (1 part based on the solid resin) of the solution of Example I, 0.7 part of styrene and 0.3 part of acrylonitrile. Add to the mixture about .67 part of xylol and heat the mixture at 180° C. under a pressure of about 15 atmospheres for about 30 minutes. Cool the reaction mixture and release the pressure. The product is a xylol solution of a co-condensation product having a solids content of about 58% and a Gardner-Holdt viscosity of Z–3 to Z–4. When the solution is cast into a thin film on a glass plate, it dries to a clear tack-free film within 10 minutes. On further drying in the open air at room temperature (25–35° C.), the film is hard and has a high gloss. It is resistant to organic solvents and to weathering to a relatively high extent when compared to films cast from the solution of Example I.

Example III

Mix together 1.67 parts of the solution of Example I, 0.5 part of styrene and 0.5 part of acrylonitrile. Add to the solution about .67 part of xylol and 1.2% based on the resin plus total monomer of di(tertiary butyl) peroxide and heat the solution at about 180° C. for about 60 minutes under a pressure of about 20 atmospheres. Cool and release the pressure. The product is a xylol solution of a co-condensation product having about 65% solids. Films cast from the solution dry to a tack-free condition within 10 minutes and on further drying in air at room temperature are tough and have a high degree of gloss. The films are substantially unattacked by organic solvents and have a high degree of resistance to the effects of weather.

Example IV

Mix together 4 parts (about 3 parts of resin) of the solution of Example I, 4.9 parts of styrene and 2.1 parts of acrylonitrile. To the mixture add 1 part of xylol and 2.6% based on the resin plus the total monomer of di(tertiary butyl) peroxide. Heat the mixture at about 210° C. for 15 minutes under a pressure of about 20 atmospheres. Cool and release the pressure. The product is a xylol solution of a co-condensation product having a solids content of about 56% and a Gardner-Holdt viscosity of U–V. Films cast from this solution dry quickly to a hard clear state.

The oil modified alkyd resins of this invention are the co-condensation products of polyhydric alcohols, polycarboxylic acids containing no aliphatic unsaturation and drying oils. The polyhydric alcohols include glycol, diethylene glycol, trimethylene glycol, glycerol, tetramethylene glycol, pentamethylene glycol, pinacol, arabitol, xylitol, adonitol, mannitol, dulcitol, sorbitol and pentaerythritol etc. A mixture of two or more of the alcohols may be used.

The polycarboxylic acids operable in this invention are aromatic carboxylic acids such as phthalic acid and aliphatic polycarboxylic acids such as succinic, glutaric, sebacic, adipic, pimelic, suberic, azelaic, tricarballylic, etc. acids and their anhydrides. Mixtures of two or more of the acids may be used.

The oils which are operable are the drying oils including linseed, tung, dehydrated castor, safflower, oiticica, perilla, sunflower seed, etc. oils. A mixture of these oils with themselves or with the semidrying oils may be used. Among the latter are soyabean, corn, cottonseed, rapeseed, sesame, etc. oils. When a semidrying oil is used, it should be used in combination with at least 10% of a drying oil. The oil acids may be used in place of, or in mixture with the oils.

The preparation of the oil-modified alkyd resins of this invention follows the conventional pattern in that sufficient polyhydric alcohol is used to enable the production of a resin having an acid number of less than 30 and the oil content of the resin ranges from 45 to 75% of the total weight of the product. It is convenient to react the polyhydric alcohol first with the oil or mixture of oils followed by reaction of the product with the polycarboxylic acid. The reaction is generally carried out in an organic solvent such as xylol, sufficient solvent being used to obtain an end product having about 60% solids.

The monomer component of the products of this reaction consists of a styrene compound and a nitrile compound. The styrene compound may be styrene itself or a methyl styrene. Included in the methyl styrenes are alpha methyl styrene, ortho methyl styrene, meta methyl styrene, para methyl styrene, ortho para dimethyl styrene and alpha para dimethyl styrene. The nitrile component consists of acrylonitrile and methacrylonitrile.

The ratio of total monomer to oil modified alkyd may vary from 2:1 to 1:5 on a weight basis. Monomer content in the higher ranges gives a harder, more brittle film whereas monomer content in the lower ranges gives a tougher but softer film.

The ratio of styrene compound to nitrile compound may be varied between 19:1 and 1:19 on a weight basis. Higher nitrile contents yield harder and yellower films while high styrene content varies the product in the direction of a softer and more nearly colorless material.

The reaction between the monomer component and the oil modified alkyd resin should be carried out at temperatures from 180° C. to 250° C. in solution in an inert solvent and under a pressure of from 10 to 50 atmospheres. The solvent is preferably an aromatic hydrocarbon such as xylol, toluol, etc. which may contain minor amounts of aliphatic hydrocarbons such as hexane, solvent naphthas, etc. The amount of solvent is not critical as long as there is sufficient to maintain a stirrable reaction medium. For convenience, the amount of solvent should be regulated so that the final product will have about the amount of solids so that films may be formed directly therefrom without need for first isolating the reaction product and then redissolving it. For most commercial uses, the amount of solvent is adjusted so that the final reaction product will be obtained as a 55–65% solids solution. If desired, a high temperature catalyst such as di(tertiary butyl) peroxide may be used in amounts up to 5% by weight based on the total reactants.

The products of this invention are useful as varnishes and paints per se and when modified with conventional paint materials such as natural and synthetic resins, fillers, pigments, colors, etc. A particularly valuable coating material is made by incorporating in the reaction product up to 25% by weight of a melamine formaldehyde resin, an ether thereof or a modification thereof with toluene sulfonamide.

*Example V*

A clear coating composition is prepared by mixing 80 parts of the solution obtained in Example III with 20 parts of a 60% solids solution of melamine resin A in a mixture of xylol and butanol. No evidence of incompatibility (development of haze) appears on mixing the solutions. Cast a 6 mil film on glass and heat the cast film at 120° C. for 30 minutes. The cured film is clear, very hard, substantially colorless, and does not crack on aging. The film is not attacked by xylol or ethanol.

Melamine resin A is prepared by reacting together 100 parts of melamine, 457 parts of Formalin (37% formaldehyde) and 43 parts of p-toluene sulfonamide under reflux at pH of 8–9 followed by further reaction with 500 parts of butanol. The product is a butanol solution of a butylated co-condensation product of melamine, formaldehyde, and p-toluene sulfonamide. For purposes of Example V it is cut with xylol to a solids content of about 60% by weight.

What is claimed is:

1. In a process for modifying a glyceride drying oil modified alkyd resin the acid moiety of which contains no aliphatic unsaturation, with a mixture of ethylenically unsaturated monomeric components by reaction at 180–250° C. in solution in an inert organic solvent, the ratio of monomer components to modified alkyd resin varying from 2:1 to 1:5 on a weight basis, said monomeric components consisting of a styrene component selected from the class consisting of styrene alpha methyl styrene, ortho methyl styrene, meta methyl styrene, para methyl styrene, ortho para dimethyl styrene, alpha para dimethyl styrene and mixtures thereof and a nitrile selected from the class consisting of acrylonitrile and methacrylonitrile the ratio of styrene component to nitrile component varying between 19:1 and 1:19 on a weight basis, the improvement which comprises carrying out said reaction under a pressure of 10 to 50 atmospheres for a period of 15–60 minutes.

2. A process as in claim 1 wherein the nitrile component is acrylonitrile.

3. A process as in claim 1 wherein the styrene component is styrene.

4. A process as in claim 1 wherein said drying oil comprises a mixture of drying oil and semidrying oil.

References Cited in the file of this patent

UNITED STATES PATENTS

| | | |
|---|---|---|
| 2,580,289 | Fantl | Dec. 25, 1951 |
| 2,586,593 | Armitage et al. | Feb. 19, 1952 |
| 2,590,653 | Schmutzler | Mar. 25, 1952 |
| 2,600,623 | Daniel et al. | June 17, 1952 |
| 2,686,765 | Arvin | Aug. 17, 1954 |
| 2,748,092 | Daniel et al. | May 29, 1956 |